April 14, 1936.                J. MACMILLAN                2,037,640
                                PNEUMATIC TIRE
                            Filed Dec. 3, 1934            2 Sheets-Sheet 1
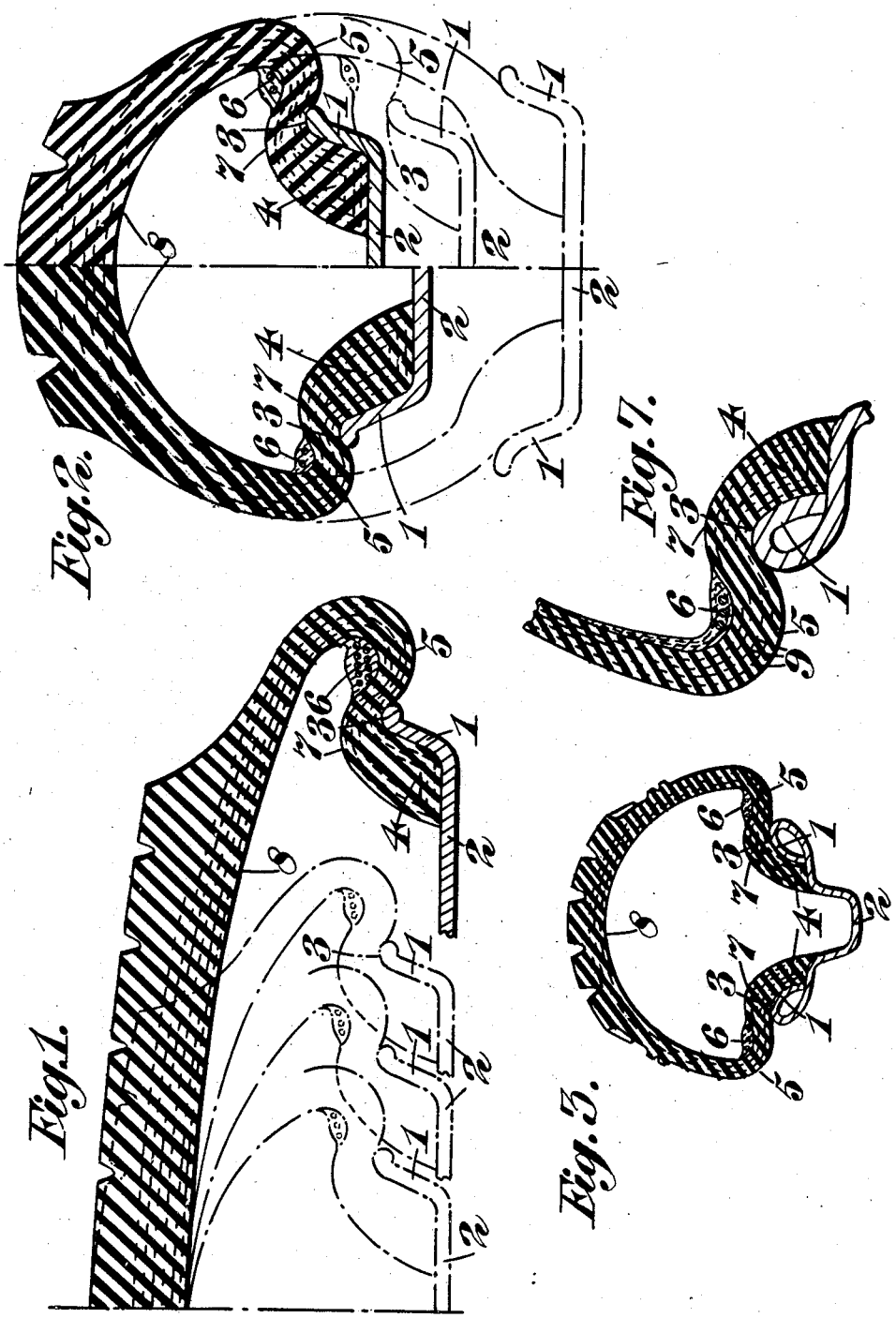
INVENTOR
John Macmillan
By Watson, Coit, Morse & Grindle
ATTYS.

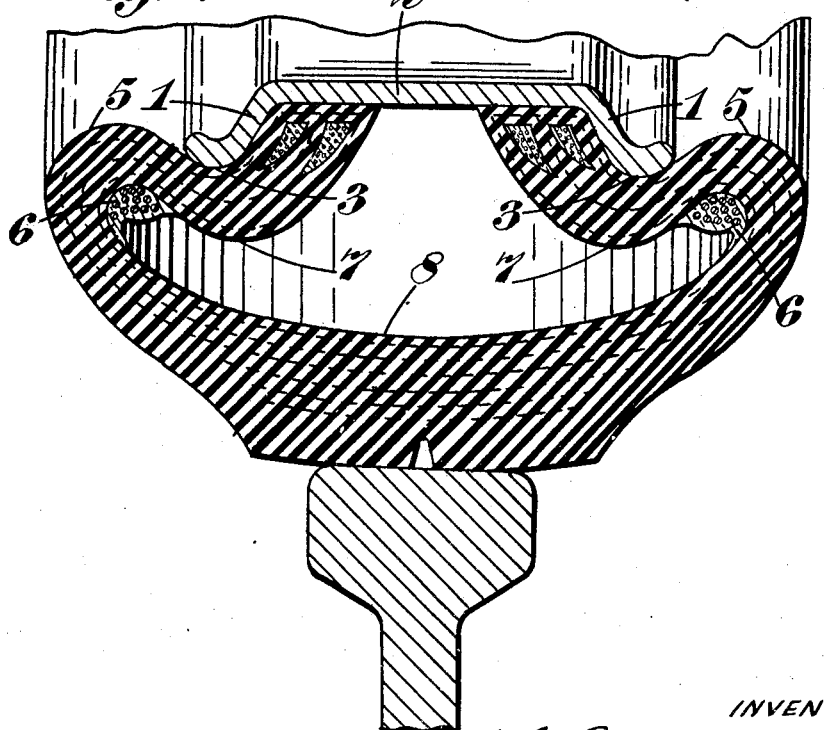

Patented Apr. 14, 1936.

2,037,640

UNITED STATES PATENT OFFICE 2,037,640

PNEUMATIC TIRE

John Macmillan, London, England, assignor to Macmillan Tyre Trust Limited, London, England, a British company Application December 3, 1934, Serial No. 755,812
In Great Britain January 17, 1933

5 Claims. (Cl. 152—13)

This invention is for improvements in or relating to pneumatic tires of the kind having base beads arranged to be located between flanges on a wheel rim so as to have a substantial bearing area on a circumferential face of said rim and having a wall extending transversely from said base beads over and beyond the width of the said flanges, whereby the broadest part of the air chamber is adjacent with said beads, which walls have associated with them circumferential reinforcing members. With this kind of tire, considerable trouble has been experienced in rupture of the wall of the tire and destructive wear taking place between the reinforcing members and the walls of the tire. An object of the present invention is to overcome these objections.

According to this invention, a pneumatic tire of the kind referred to above is characterized in that said circumferential reinforcing members are located along said transverse parts of the wall outside but adjacent said rim flanges and base beads. By these means, those parts of the tire which are liable to be submitted to the greatest strains and flexure are adequately strengthened and stiffened.

A feature of the invention consists in that the side walls of the tire extend from said base beads outwardly over the rim flanges and inwardly toward the center of the wheel so as to locate said flanges between the inwardly directed parts of said walls and said beads, and in that said reinforcing members are located in said inwardly directed parts. The air chamber may also be arranged to extend over the flanges toward the wheel center so as to exert pressure against the inwardly directed part of the tire and force it toward the beads, whereby the rim flange is gripped.

A further feature of the invention consists in that said circumferential reinforcing members are arranged across the greater portion of the transverse parts of the wall which extends from each outer edge of the rim to the broadest part of the air chamber so as to lie radially adjacent the rim flanges.

Yet a further feature of the invention consists in that the diameter of the circumferential reinforcing members is less than the greatest diameter of the beads, so as to maintain the inwardly directed part of the cover opposite said beads, whereby said cover is securely anchored to the rim flanges.

As already indicated, the circumferential reinforcing members are located along said transverse parts of the wall. Preferably said members are attached to said wall but they may be secured to the inner tube in a still further feature of the invention.

Yet a further feature of the invention consists in that the reinforcing members are secured to each side wall of the cover by being located in the bend of a strip of fabric other than those plies extending into said beads, which strip is folded upon itself; or, by being located in the bend formed in a number of superimposed strips other than those extending into said beads, which strip, or strips, is, or are, vulcanized around the side wall. For example, one of the usual plies of material may be folded around the reinforcement and the free end of the ply directed back toward the tire tread, or the reinforcement may be located in a bend formed in a number of superimposed strips which strip, or strips, is, or are, vulcanized integral with the side wall. Preferably, those parts of the strip which extend from the bend are directed towards the tread and are of different lengths so as to prevent objectionable ridges being formed on the inside of the cover.

The following is a description of a number of embodiments of the invention, reference being made to the accompanying drawings, in which—

Figure 1 illustrates cross-sections of different tires having the same centre-line height but having different widths;

Figure 2 shows cross-sections of a number of covers having different heights but embodying the same basic features;

Figure 3 shows a cross-section of a tire according to the present invention mounted on the same rim as shown in Figure 3;

Figure 4 shows a cross-section of a similar tire to that shown in Figure 4, but mounted upon a split flat base rim;

Figure 5 shows an alternative method of securing the reinforcing members to the cover;

Figure 6 shows a section of a tire suitable for use on railway vehicles or road rail vehicles; and Figure 7 is a similar view to that of Figure 6 showing yet another alternative method of securing the reinforcing members to the cover.

Figure 1 illustrates cross-sections of different tires having the same centre-line height, but having different widths. It will be appreciated that the further the cross-sectional contour of the air chamber departs from circular, the greater is the tendency of the air pressure to draw together the sides of the carcass and the beads. However, as already indicated earlier in the specification, the flanges 1 of the wheel rim 2, are located in channels 3 formed between the beads 4 of the tire and a part 5 of the tire which extends over the outside of the flanges in a direction towards the axis of the wheel. This latter part of the tire is reinforced by steel wires 6, arranged to extend circumferentially along the side walls of the cover close to the beads, the diameter of which circumference is less than the greatest diameter 7 of the circumferential beads 4, which steel wires thus tend to prevent the part of the tire 5 being forced upwards away from the flange when the tire is inflated or when the tire is subjected to lateral thrust. It will be noted that the reinforcements extend over the greater part of those portions of the wall which extend from each outer edge of the rim for the maximum width of the air chamber, and thus prevent those parts from buckling. The width of the tire can be large as compared with its height, since the tension in the upper part of the carcass 8 tending to draw the beads together, merely has the effect of drawing the reinforced part of the tire 5 against the rim flange 1.

It will also be appreciated that in obtaining the required cross-sectional area of the air chamber to carry a given load by making its width greater than its height, the resistance to lateral rolling is very much increased. Nevertheless, if a tire is required having relatively greater heights than that shown in Figure 1, and yet to withstand lateral roll, it can be obtained according to this invention as shown in Figure 2, which illustrates a number of cross-sections arranged to carry the same load and having similar overall widths but different heights. It will be noted, however, that in each case, the height is considerably less than that of a standard cover for the same load, which standard cover is shown in dotted lines extending downwardly below the other outlines.

The construction shown in Figure 3 is suitable for fitting to a standard rim as used on a tire of 3½ inches width. It will be noted that the lower part of the side wall emerging from the bead is of the same diameter as the greater diameter of the rim flange which permits of easier fitting. The overall width of this tire is 4½ inches as compared with a prior art tire of 3½ inches and thus provides a larger air chamber on which a heavier load can be carried or the same load at a much reduced air pressure.

Figure 4 shows a section of a tire according to the present invention for replacing a conventional 3½ inch tire, but mounted upon a split flat base rim of the same width and diameter. The tread diameter in each case is the same, but the overall width of the tire of Figure 4 is five inches. A larger air chamber is thus produced and a lower air pressure may be employed, or a heavier load may be carried with the same air pressure. In this instance, the lower parts of the side walls extend toward the wheel axis which arrangement provides greater lateral stability.

It will be noted in Figures 1, 2 and 3, 4 that the reinforcing members 6 are shown vulcanized to the inner surface of the cover. Alternatively, the reinforcing members could be vulcanized to the outside of the cover. They may, however, be located between the plies of cords 9, as shown in Figure 5. In a further modification one of the plies may be folded around the reinforcement and the free end of the ply may be directed back towards the tread, thus providing a secure anchorage.

The construction shown in Figure 7 is suitable for a tire 22 inches wide and has a centre-line height of only 8½ inches. This form of tire is particularly suitable for carrying very heavy loads over soft surfaces.

Figure 6 shows a section of a tire suitable for use on railway vehicles or road rail vehicles and could replace tires mounted in twin formation. In this construction, the contour of the outer part of the air chamber between the circumferential reinforcing members 6 is arranged to be either an arc of a circle having a large radius, or a flattened curved shape, in order that when the tread is in a loaded condition, it may flatten out circumferentially along the rail as well as laterally of the rail, thus providing a larger area of rail contact over which the load is distributed. The required cross-sectional area of the air chamber to carry a given load can be obtained according to this invention with a very low centre-line height of the tire.

Figure 7 shows an arrangement whereby the reinforcing members are securely anchored to the carcass of the tire. This is effected by folding a strip 10 of corded fabric upon itself and arranging the reinforcing members in the bight of the fold. The folded strip is then vulcanized to the inside of the cover on each side wall thereof so that the reinforcing members are located in the required position relatively to the beads, as described earlier in the specification, and so that the two parts of the strip are directed towards the tread. It will be noted that these two parts are of different lengths so as to prevent an objectionable ridge being formed on the inside of the cover.

I claim:

1. A pneumatic tire comprising, in combination base beads adapted to be located between flanges on a wheel rim and to have a substantial bearing area on a circumferential face of said rim, transverse wall parts attached to said base beads and arranged to seat on and extend over and beyond the width of said flanges, side walls extending from said transverse wall parts radially outward from the wheel axis toward a tread part, which transverse wall parts, side walls and tread are so shaped as to accommodate an air chamber having its broadest part adjacent said base beads, and circumferential reinforcing members so associated with said transverse wall parts that each said wall part has at least one circumferential reinforcing member disposed approximately midway between the broadest part of the tire and the portion seating on the rim flange.

2. A pneumatic tire comprising, in combination, base beads adapted to be located between flanges on a wheel rim and to have a substantial bearing area on a circumferential face of said rim, transverse wall parts attached to said base beads and arranged to seat on and extend over and beyond the width of said flanges, side walls extending from said transverse wall parts radially outward from the wheel axis toward a tread part, which transverse wall parts, side walls and tread are so shaped as to accommodate an air chamber having its broadest part adjacent said base beads and extending beyond the width of the rim flanges and radially inward toward the wheel axis, and circumferential reinforcing members so associated with said transverse wall parts that each said wall part has at least one circumferential reinforcing member disposed approximately midway between the broadest part of the tire and the portion seating on the rim flange.

3. A pneumatic tire comprising, in combination base beads adapted to be located between flanges on a wheel rim and to have a substantial bearing area on a circumferential face of said rim, transverse wall parts attached to said base beads and arranged to seat on and extend over and beyond the width of said flanges, side walls extending from said transverse wall parts radially outward from the wheel axis toward a tread part, which transverse wall parts, side walls and tread are so shaped as to accommodate an air chamber having its broadest part adjacent said base beads and extending beyond the width of said flanges and circumferential reinforcing members arranged across the greater part of the width of each said transverse wall part between the widest part of the air chamber and a rim flange and having at least one circumferential reinforcing member disposed approximately midway between the broadest part of the tire and the portion seating on the rim flange.

4. A pneumatic tire comprising, in combination, base beads adapted to be located between flanges on a wheel rim and to have a substantial bearing area on a circumferential face of said rim, transverse wall parts attached to said base beads and arranged to seat on and extend over and beyond the width of said flanges, side walls extending from said transverse wall parts radially outward from the wheel axis toward a tread part, which transverse wall parts, side walls and tread are so shaped as to accommodate an air chamber having its broadest part adjacent said base beads and extending beyond the width of said rim flanges and metallic closed circumferential reinforcing members associated with each transverse wall part and located in the bend of a strip of fabric folded upon itself and attached to said wall part so that at least one of said reinforcing members is disposed approximately midway between the broadest width of the tire and the portion seating on the rim flange, and at least one of the free ends of said strip extends beyond the greatest width of the air chamber towards said tread portion.

5. A pneumatic tire comprising, in combination, base beads adapted to be located between flanges on a wheel rim and to have a substantial bearing area on a circumferential face of said rim, transverse wall parts attached to said base beads and arranged to seat on and extend over and beyond the width of said flanges, side walls extending from said transverse wall parts radially outward from the wheel axis toward a tread part, which transverse wall parts, side walls and tread are so shaped as to accommodate an air chamber having its broadest part adjacent said base beads and extending beyond the width of said rim flanges and metallic closed circumferential reinforcing members associated with each said transverse wall part and located in the bend of a strip of material attached to said wall part which circumferential reinforcing members are arranged to extend over a greater part of the width of the transverse wall part between the greatest width of the air chamber and the portion seating on the rim flange and the free ends of which folded strip extend towards the tread portion beyond the greatest width of the air chamber.

JOHN MACMILLAN.